F. S. SEAGRAVE.
WATER TOWER.
APPLICATION FILED JULY 7, 1904.

1,013,323.

Patented Jan. 2, 1912.

F. S. SEAGRAVE.
WATER TOWER.
APPLICATION FILED JULY 7, 1904.

1,013,323.

Patented Jan. 2, 1912.

F. S. SEAGRAVE.
WATER TOWER.
APPLICATION FILED JULY 7, 1904.

1,013,323.

Patented Jan. 2, 1912.
7 SHEETS—SHEET 5.

UNITED STATES PATENT OFFICE.

FREDERIC SCOTT SEAGRAVE, OF DETROIT, MICHIGAN.

WATER-TOWER.

1,013,323.  Specification of Letters Patent.  Patented Jan. 2, 1912.

Application filed July 7, 1904. Serial No. 215,664.

*To all whom it may concern:*

Be it known that I, FREDERIC SCOTT SEAGRAVE, a citizen of the United States, and resident of the city of Detroit, State of Michigan, United States of America, have invented certain new and useful Improvements in Water-Towers; and I do hereby declare that the following is a full, clear, and exact description of the same.

My invention relates to portable water towers, and the like, comprising a truck preferably having a turntable mounted thereon, and a tower formed in two portions, one telescoping into the other, the lower part being fulcrumed at its lower end to the turntable and the upper part having a nozzle at its upper end, and its lower end adapted to have the hose leading from the water supply connected thereto.

The invention relates particularly to the construction of the lower portion and to the fulcruming and raising thereof, the strengthening of the upper portion, and to the manipulation of the turret.

The invention may be said briefly to consist of a trussed structure of triangular cross-section having portions on either side of a transverse line, converging to points on a longitudinal axial line extending centrally of the triangle. This structure is one of the main features of my invention and is applicable to other uses than as a member of a portable tower.

In the portable tower, to which this invention has particular reference, such structure acts as a guide, for and supports the tubular upper portion of the tower. The means for hoisting the lower portion of the tower, and with it the upper portion, consists of an improved tension device having a tendency to retain the tower in its elevated position and which is in tension when the tower is lowered, such tension device together with means for augmenting the same to raise the tower, accommodating themselves automatically to the different angular positions assumed by the tower. The tubular upper portion is provided with a flexible truss adapted to effect a connection between the lower and upper portions and brace the upper portion upon the lower portion.

The turret is adjustably connected to the truck in such a manner as to enable it to be moved from end to end of such truck.

For full comprehension, however, of my invention reference must be had to the accompanying drawings forming a part of this specification in which similar reference characters indicate the same parts and wherein—

Fig. 14.

The truck frame 2 is of ordinary construction, and the turn-table 3 also of ordinary construction, is preferably mounted upon the rear portion thereof.

The tower proper consists of a lower oscillatory portion, and an upper longitudinally movable tubular portion 4 having a nozzle 5 of any approved construction at its upper end, while the said tubular portion is raised or lowered in the oscillatory portion by any preferred means.

My invention relates particularly to the construction of the lower oscillatory portion of the tower, to the means for raising and lowering the same, to the fulcruming thereof and to the trussing of the upper portion as has been hereinbefore mentioned and I will first describe in detail the construction of the lower oscillatory portion of the tower.

Figure 10:
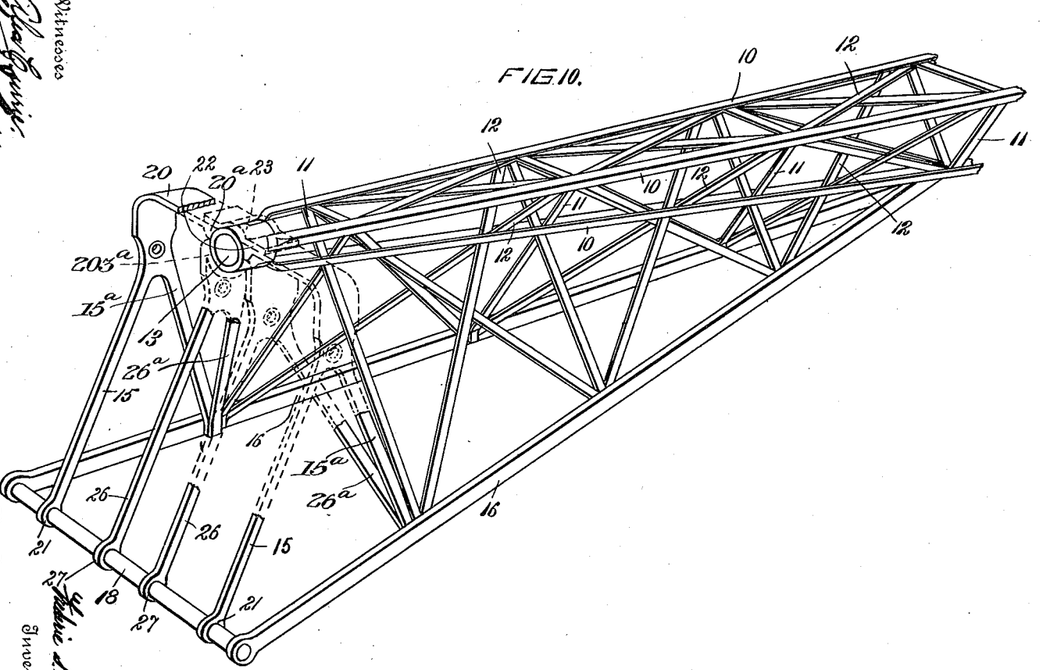
Fig. 10 is a perspective view of the rear end of my improved trussed structure of triangular cross-section and illustrating particularly the means for fulcruming the same.

My improved lower portion of the tower is of triangular cross-section and consists of three longitudinals 10, preferably of angle iron, bent to present when assembled and secured together by struts 11 and counter-braces 12 a trussed structure of triangular cross-section and tapering toward each end and terminating in rounded bearings 13 and 14, respectively, adapted to support and guide the tubular upper portion, although if desired the ends can be of other forms to suit different requirements. This trussed structure or lower portion of the tower is pivoted to its carrying base preferably as follows:—A pair of main braces 16 extend from the middle of the said trussed structure and are spread apart to impart stability to the structure and their ends fit upon a shaft or axle 18 as at 21. A series of branched members connect the lower end of the trussed structure to the shaft or axle 18, and comprise a pair of rectangular sections, and an inverted U-section. Each rectangular section has its angle rounded as at 22 and one leg branched as at 15 and 15$^a$, the end of branch 15 fitting upon the shaft or axle 18 as at 21 and the end of branch 15$^a$ being rigidly connected to the brace 16; while the other leg 20 extending inwardly to the annular bearing member 13 and abutting thereagainst where it is formed with a reinforcing rib 20$^a$ which is concaved to conform to the exterior of the said bearing member. The ends of the legs 20 which abut against the member 13 are connected by a yoke 23 which together with a central downwardly curved portion 203$^a$ of the inverted U-member incloses the bearing member 13. The inverted U-section has each of its legs branched as at 26 and 26$^a$ see Fig. 10, the ends of the branches 26 fitting as at 27, upon the shaft or axle 18 between the branches 15, and the ends of the branches 26$^a$ being rigidly connected through the branches 15$^a$ to the brace 16; while the middle curved portion 203$^a$ fits upon the under side of the annular bearing members 13, as described above forms with the concave portions 22 and the yoke 23, a bearing completely encircling the said annular bearing member 13. Some of the struts 11 and counter-braces 12 are preferably elongated and connected to the braces 16 for the purpose of strengthening the pivotal connection of the trussed structure to the turn-table 3 or other carrying base although, if desired, especially in the smaller sizes of towers the elongation may be eliminated. The trussed structure thus constructed and fulcrumed is raised and lowered by the following means;—A pair of oblong boxes 30 formed with one half increased in width and interiorly rounded as at 31, are provided with trunnions 32 on their ends which bear in bearings 33 formed in the upper portion of the branched legs 26 and 26$^a$ see Fig. 10, and branched legs 15, 15$^a$. A pair of cylinders 35 are carried rigidly in the rounded portions 31 of the boxes and a pair of pistons 36 located in these cylinders are connected by piston rods 37, to a shaft 39 such piston rods being each formed with an eye 38 mounted rotatably upon the shaft 39. The shaft 39 is supported in a bracket 40 upon the turn-table and a pair of screw-threaded rods 42 are threaded at one end through a pair of nuts 142 pivotally mounted in the boxes 30 adjacent to the cylinders 35 and have their other ends mounted in journal bearings 43 carried pivotally in a pair of boxes 143 carried in turn partially by the shaft 39 and partially by the upper inwardly turned ends of a pair of standards 144 connected together and braced by a yoke 145. The ends of the rods 42 are free to rotate in the journal bearings 43 but are held thereby against longitudinal displacement. These two screw-threaded rods provide a rigid stay or brace on each side of the axial line of the tower thus imparting thereto the greater rigidity required by a water tower beyond that necessary to a ladder. The object of pivoting these journal boxes and the nuts is to obviate any chance of the screw threaded rods binding therein, thus reducing the friction to a minimum and facilitating the operation of the tower. The rear ends of these screw-threaded rods have bevel gears 44 mounted thereon, and a counter-shaft 45 mounted in bearings on the boxes 143 has a pair of bevel gears 46 mounted thereon and adapted to intermesh with the bevel gears 44, the ends of this countershaft 45 being squared to receive a handle 48 for turning the same. Upon turning this handle in one direction the countershaft and with it the bevel gears and the screw threaded rods, will be rotated, and the base of the pedestal drawn upon, and the opposite end thereof raised. In order to facilitate this raising of the pedestal, I mount an expansile helical spring in each cylinder between the rear end thereof and the piston therein, the function of these springs being to exert a pressure between the pistons and the rear ends of the cylinders and tend to move them apart and therefore tend to elevate the forward end of the pedestal. As the pedestal is being raised the cylinders 35 will turn upon the trunnion of the boxes 30, and the screws and piston rod will in a like manner accommodate themselves to the different angular positions of the pedestal.

Figures 1, 9:
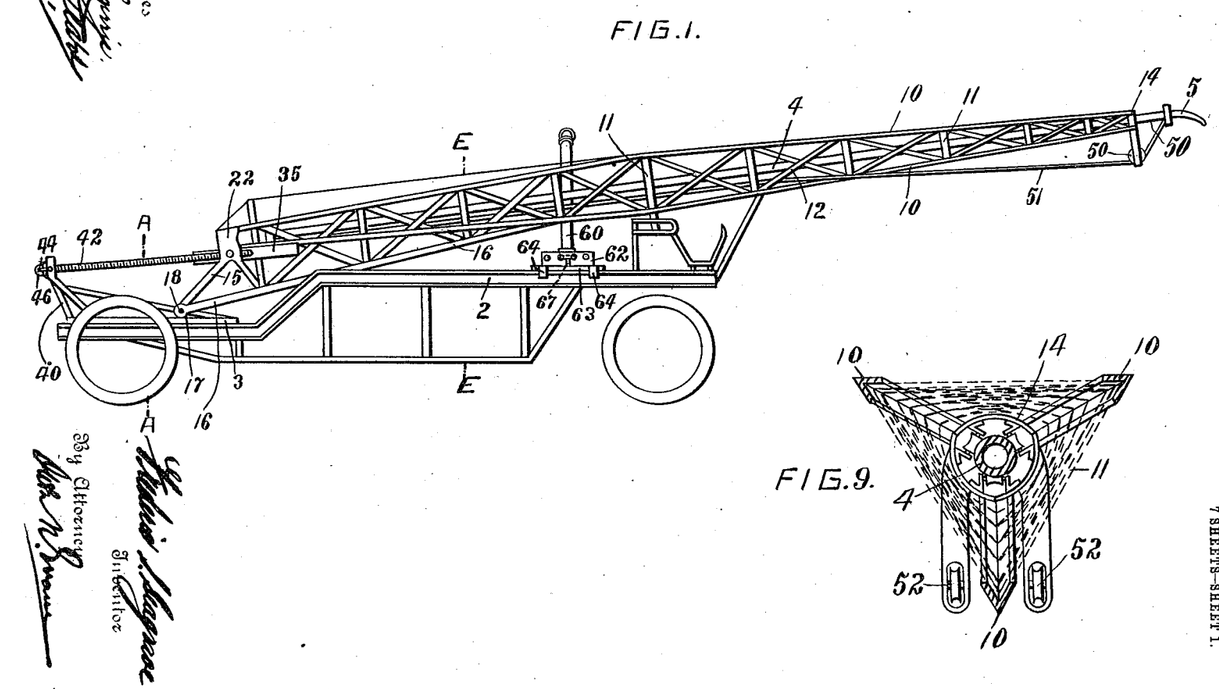
Figure 1 is a side elevation of a tower constructed according to my invention.
Fig. 9 is a transverse vertical sectional view taken on line D, D, Fig. 6.
Figures 2, 3, 4:
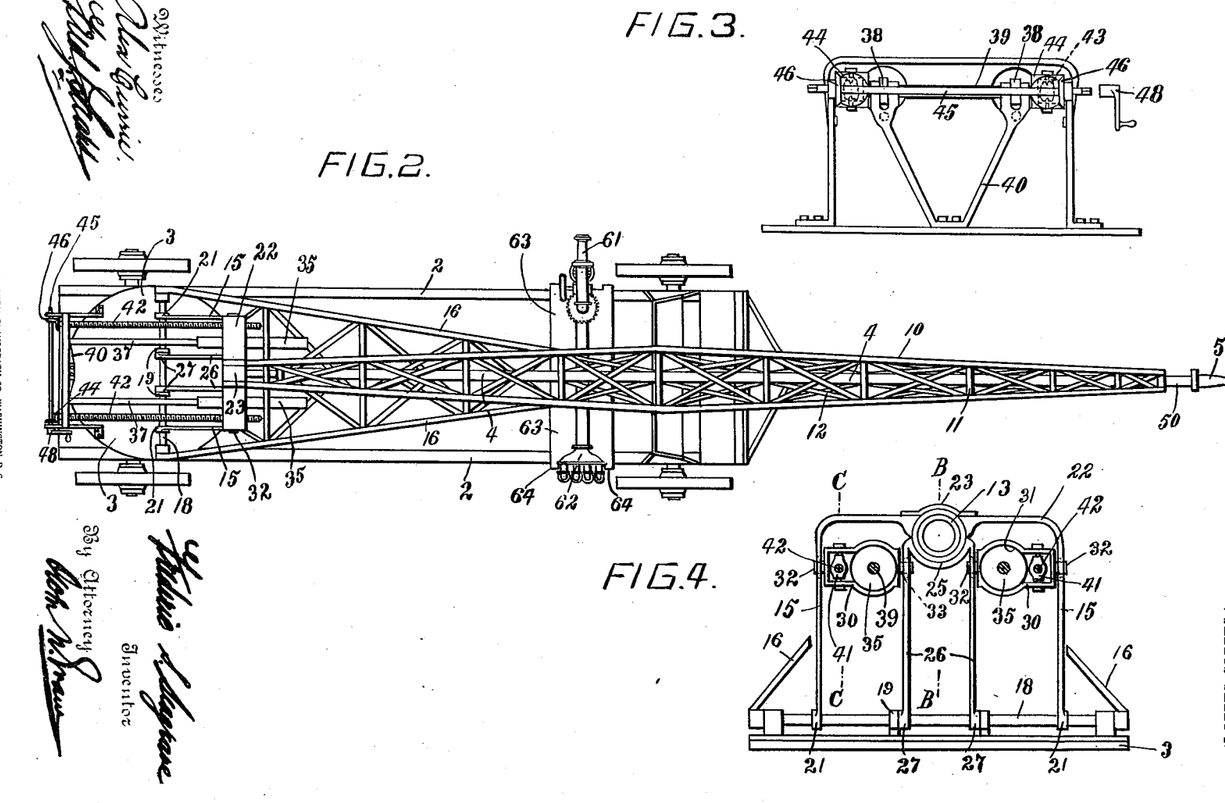
Fig. 2 is a plan view thereof.
Fig. 3 is a rear end view.
Fig. 4 is a transverse vertical sectional view taken on line A, A, Fig. 1.
Figures 5, 6, 7, 8:
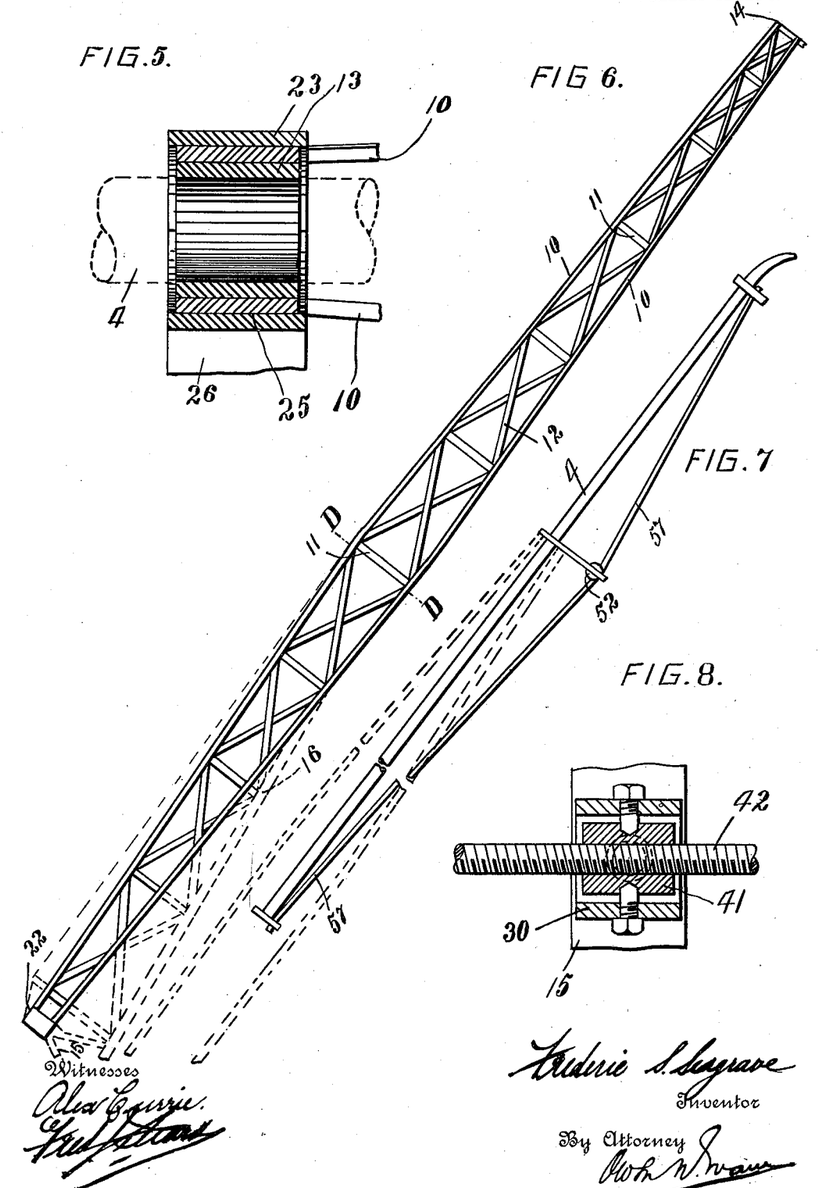
Fig. 5 is an enlarged longitudinal vertical sectional view taken on line B, B, Fig. 4.
Fig. 6 is a side elevation of my improved trussed structure of triangular cross-section.
Fig. 7 is a side elevation of the upper tubular portion of the tower illustrating particularly the means for bracing the same.
Fig. 8 is an enlarged longitudinal vertical sectional view taken on line C, C, Fig. 4.

In order to brace the tubular member 60 upon the improved trussed lower structure and strengthen it to withstand the back pressure of the water flowing from its upper end I utilize a flexible truss or tension device, preferably consisting of a pair of wire ropes 51, secured at one end to the upper end of this tubular member, passing over antifriction rollers 52 carried by the trussed lower structure and connected at their opposite ends to the lower end of the said tubular member. This flexible truss or tension device owing to its bearing relation with the trussed lower structure will reinforce the tube and augment it in withstanding the back pressure of the flowing water.

Figure 11:
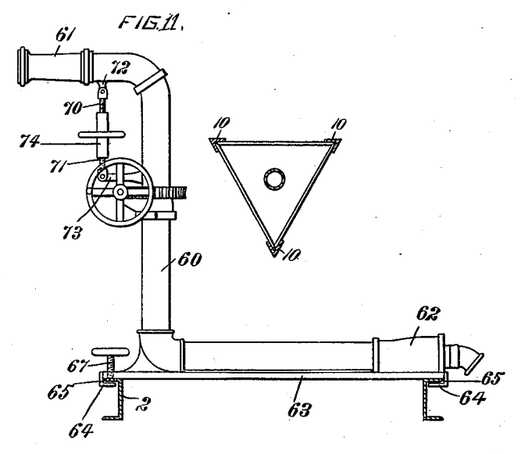
Fig. 11 is a similar view to Fig. 4 but taken on line E, E, Fig. 1 and illustrating the connection of the turret to the truck.
Figure 12:
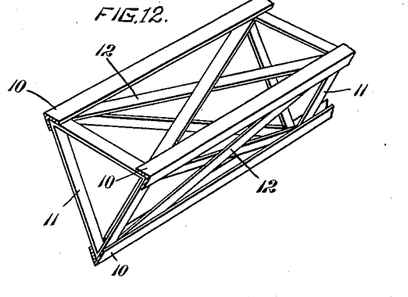
Fig. 12 is a detailed sectional perspective view of my improved trussed structure of triangular cross-section.
Figure 13:
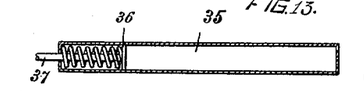
Fig. 13 is a longitudinal vertical sectional view of the tension device for facilitating the raising of the tower.
Figure 14:
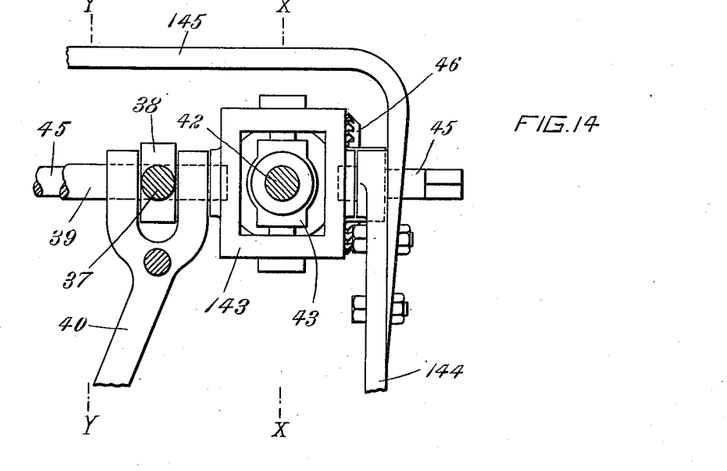
Fig. 14 is a front elevation of a portion of the rear frame for supporting the tower raising shaft.
Figure 15:
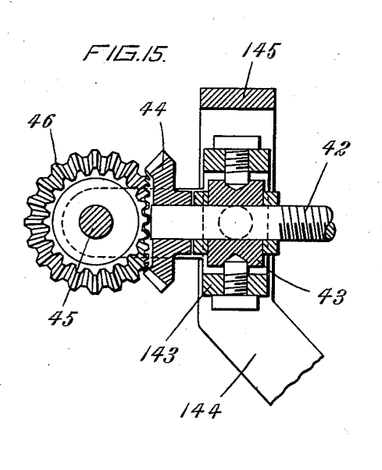
Fig. 15 is a transverse vertical sectional view taken on line X. X.
Figure 16:
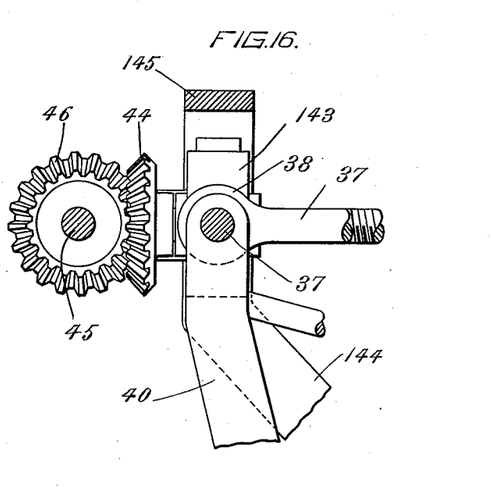
Fig. 16 is a similar view to Fig. 15 and taken on line Y, Y, Fig. 14.
Figure 17:
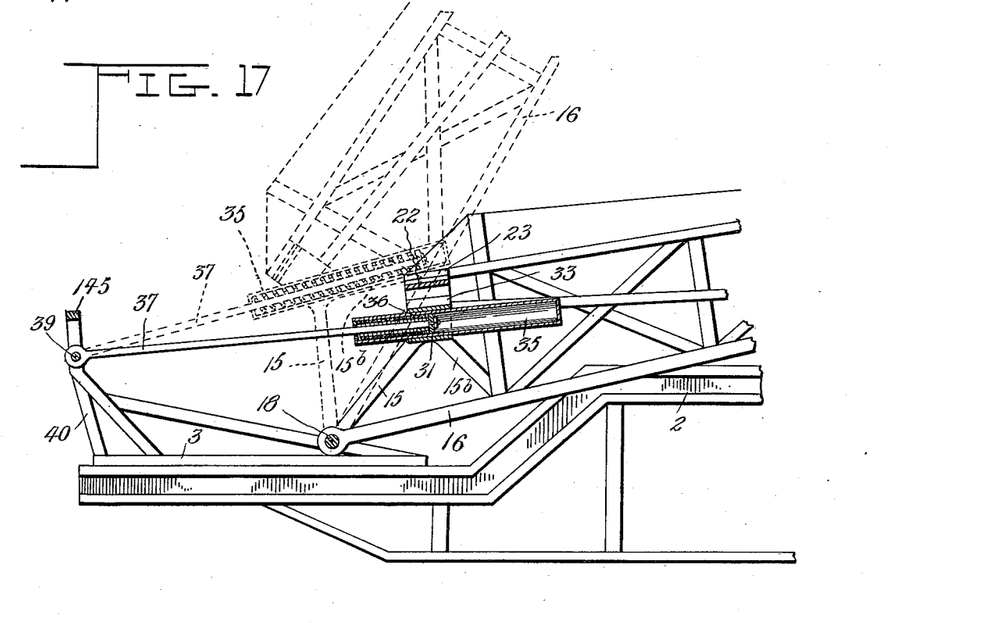
Fig. 17 is a detail view illustrating the means for facilitating the raising of the tower.
Figures 18, 19:
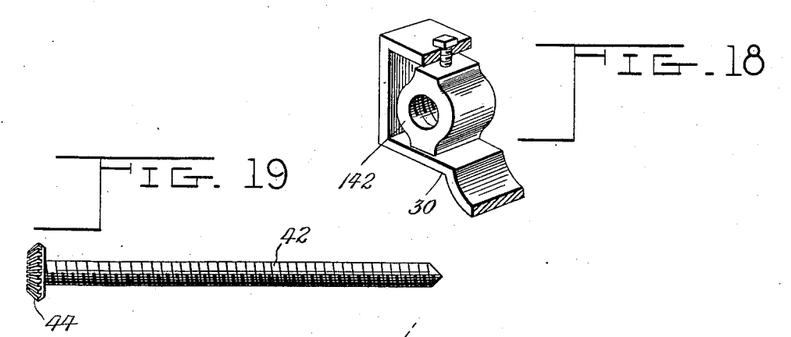
Fig. 18 is a perspective view of the internally screw-threaded block by which the screw-threaded rods are operatively connected to the tower.
Fig. 19 is a detail view of one of the screw-threaded rods.

My improved deck-turret consists of a stand-pipe 60, a nozzle 61, and a branch coupler 62, which in themselves are of usual construction, but according to my invention this turret is mounted upon a base 63 having a series of clips 64 upon each end thereof and adapted to engage beneath the flanges 65 of the longitudinal angle irons 2 of the frame of the truck, and a set screw 67 carried by one end of this base is adapted to bear upon one of the said longitudinals of the frame and secure said base in any position to which it may be moved along the truck. The truck is provided with an elongated horizontal portion of which the longitudinal angle irons 2 form the sides and allow of the movement or adjustment of the turret therealong from end to end of the truck. My improved means for manipulating the nozzle consists of a pair of oppositely threaded screws 70 and 71 pivotally connected at their opposite ends to a pair of perforated lugs 72 and 73 carried respectively by the nozzle and standpipe, while a turn-buckle 74 receives the adjacent ends of these screws, and by rotating the said turnbuckle in one direction or the other the nozzle may be directed in any desired angle.

What I claim is as follows:—

1. The combination with a wheeled fire apparatus having an elongated horizontal carrying portion, of a base adjustably connected to said elongated carrier, a branch coupler secured upon said base, a standpipe secured to said branch coupler and projecting vertically therefrom, a nozzle secured to the upper end of said standpipe, and means for securing said base in any position to which it may be moved along the said elongated carrier.

2. In a turret having a standpipe, and a nozzle movably connected to the upper end thereof, of a turnbuckle, and an operative connection between said turnbuckle and standpipe and nozzle, for the purpose of adjusting said nozzle to different angular positions.

3. In a turret having a standpipe and a nozzle movably connected to the upper end thereof, of a turnbuckle, a pair of screws pivotally connected at one end to the standpipe and nozzle respectively, and having their opposite ends inserted into and operatively connected to the turnbuckle, said screws being oppositely threaded.

4. A water tower comprising a truck, a table upon the truck, an angle iron structural member of triangular cross-section tapering to its lower end, a diagonally downwardly extending integral portion of the structural member pivoted to the table in close proximity thereto; a water conductor carried by the structural member; and means for raising and lowering the tower on its pivot.

5. The combination with a base and a member of a water tower pivotally mounted thereon, of a cylinder carried by the member, a piston in the cylinder, a spring also in the cylinder such spring being located between the piston and the outer end of the cylinder, a piston rod connected to the piston at one end and to the base at its opposite end, the said spring being under compression when the tower is down and adapted to exert a raising force upon the said tower by its expansion.

6. In a fire apparatus, the combination with a carrying member and a member mounted thereon, of means pivotally connecting the last mentioned member to the carrying member and consisting of a device secured to one of the said members, a cylinder mounted pivotally in the device and secured against longitudinal movement relatively thereto, a piston and a spring in the cylinder, the spring being located between the piston and the outer end of the cylinder, a piston rod connected to the piston at one end and pivotally connected at its opposite end to the other member, the points of connection of the said members being at opposite sides of the pivot point of the member, such spring being adapted to exert yielding resistance to the movement of the piston toward the outer end of the cylinder; and means for raising the free end of the pivoted member toward the pivot point of the piston rod.

7. In a fire apparatus, the combination with a carrier and a member mounted thereon, of means pivotally connecting the last mentioned member to the carrier and consisting of a device secured to the base of the said pivoted member, a cylinder mounted pivotally in the device and secured against longitudinal movement relatively thereto, a piston and a spring in the cylinder, the spring being located between the piston and the outer end of the cylinder, a piston rod connected to the piston at one end and pivotally connected at its opposite end the latter connection being at a point beyond the pivot point of the pivoted member, such spring being adapted to exert yielding resistance to the movement of the piston toward the outer end of the cylinder and means for raising the free end of the pivoted member toward the pivot point of the piston rod.

8. In a fire apparatus, the combination with a carrier and a raisable member pivotally mounted thereon, of means pivotally connecting the raisable member to the carrier and consisting of a device secured to the base of the raisable member and projecting beyond each side thereof, a pair of cylinders mounted pivotally in the device at opposite sides of such base and secured against longitudinal movement relatively thereto, a pair of pistons and a pair of springs in the cylinders, the springs being located between the pistons and the outer ends of the cylinders, a pair of piston rods connected to the pistons at one end and pivotally connected to the carrier at their opposite ends the latter connection being at a point beyond the pivot point of the raisable member, such springs being adapted to exert yielding resistance to the movement of the pistons into the cylinders and means for raising the free end of the member toward the pivot points of the piston rods.

9. In a fire apparatus, the combination with a carrier and a member mounted thereon, of means pivotally connecting the said member to the carrier and consisting of a frame pivoted to the carrier and having branch braces connected rigidly to the said member, such frame being connected rigidly to the base of the member and presenting a device projecting beyond each side thereof, a pair of nuts mounted pivotally in the device one at each side of the base, a frame mounted upon the carrier at a distance from the pivot point of the said member, a pair of screw threaded rods mounted rotatably in the last mentioned frame and threaded through the nuts, and means for rotating such rods.

10. In a fire apparatus, the combination with a carrier and a member mounted thereon, of means pivotally connecting the member to the carrier and consisting of a frame pivoted to the carrier and having branch braces connected rigidly to the said member, such frame being connected rigidly to the base of the member and presenting a device projecting beyond each side of the latter, a pair of cylinders mounted pivotally in the device at opposite sides of such base and secured against longitudinal movement relatively thereto, a pair of pistons and a pair of springs in the cylinders, a pair of piston rods connected to the pistons at one end and pivotally connected to the carrier at their opposite ends the latter connection being at a point beyond the pivot point of the said member, such springs being adapted to exert yielding resistance to the movement of the pistons toward the outer end of the cylinders, a pair of nuts mounted pivotally in the device one at each side of the base, a frame mounted upon the carrier at a distance from the pivot point of the said member, a pair of screw threaded rods mounted rotatably in the last mentioned frame and threaded through the nuts, and means for rotating such rods.

11. In a fire apparatus comprising a pair of members one adapted to be raised upon the other, the combination with the said members, of a tension device connected at its opposite ends to different points upon the raisable member, and a roller carried by the other member and engaging the tension device for the purpose of bracing the raisable member.

12. In a fire tower comprising a pair of members one adapted to be raised upon the other, the combination with the said members, of a tension device of approximately the same length as the raisable member and connected at its opposite ends to the opposite ends of the raisable member, and a roller carried by the other member and engaging the tension device, for the purpose of bracing the raisable member.

13. In a fire tower comprising a carrying structure and a tubular member adapted to be raised upon the carrying structure, the combination with the said members, of a tension cable of approximately the same length as the tubular member and connected at its opposite ends to the opposite ends of the same, and a roller carried by the carrying structure and engaging the tension cable, for the purpose of bracing the tubular member.

14. In a fire apparatus, the combination with a wheeled truck, of a platform slidable bodily upon the truck, a hose pipe mounted rigidly upon and movable bodily with the said platform to different operating positions along the truck.

15. In a fire apparatus, the combination with a wheeled truck, of a platform mounted slidably upon the truck and disposed transversely relatively thereto, such platform being adapted to be displaced longitudinally of the said truck, a horizontal pipe mounted rigidly upon the platform and having one end turned upright and provided with a nozzle, and means for coupling a hose to the free end of the horizontal portion of the pipe.

In testimony whereof, I have affixed my signature, in presence of two witnesses.

FREDERIC SCOTT SEAGRAVE.

Witnesses:
WILLIAM P. McFEAT,
FRED J. SEARS.

Copies of this patent may be obtained for five cents each, by addressing the "Commissioner of Patents, Washington, D. C."